United States Patent [19]

Miura

[11] Patent Number: 5,695,296
[45] Date of Patent: Dec. 9, 1997

[54] CONNECTOR FOR PLATES

[75] Inventor: Hideya Miura, Aichi-ken, Japan

[73] Assignee: Nifco, Inc., Kanagawa-ken, Japan

[21] Appl. No.: 601,848

[22] Filed: Feb. 15, 1996

[30] Foreign Application Priority Data

Feb. 20, 1995 [JP] Japan ................. 7-054966

[51] Int. Cl.⁶ .................................. F16B 37/04
[52] U.S. Cl. .................. 403/2; 403/393; 403/405.1; 411/41; 411/174; 411/553
[58] Field of Search .................. 403/2, 21, 393, 403/405.1, DIG. 10; 411/41, 174, 175, 508, 509, 510, 552, 553

[56] References Cited

U.S. PATENT DOCUMENTS

| | | | |
|---|---|---|---|
| 3,411,397 | 11/1968 | Birmingham | 411/41 |
| 3,454,071 | 7/1969 | Strange | 411/174 |
| 4,333,211 | 6/1982 | Gunther | 411/175 X |
| 4,408,939 | 10/1983 | Graff et al. | 411/174 X |
| 4,676,706 | 6/1987 | Inaba | 411/175 |
| 4,755,090 | 7/1988 | Macfee, Jr. et al. | 411/174 X |
| 4,762,437 | 8/1988 | Mitomi | 411/508 X |
| 4,826,375 | 5/1989 | Holton | 411/174 |
| 4,865,881 | 9/1989 | Sessa et al. | 411/174 X |
| 4,883,397 | 11/1989 | Dubost | 411/174 |
| 4,897,005 | 1/1990 | Peterson et al. | 411/174 X |
| 4,987,639 | 1/1991 | Baiuley et al. | 411/41 X |

FOREIGN PATENT DOCUMENTS

273231  11/1989  Germany ................. 403/382

Primary Examiner—Kenneth J. Dorner
Assistant Examiner—Andrea Chop
Attorney, Agent, or Firm—Sughrue, Mion, Zinn, Macpeak & Seas, PLLC

[57] ABSTRACT

A connector for plates, including a connector body having a base plate bent at its intermediate portion to form plate insert recesses and, and pin insert holes formed through the base plate; a pin member having a shaft portion and a head portion formed at one end of the shaft portion, the shaft portion having elastically deformable locking lugs, the other end portion of the shaft portion being inserted in at least one of the pin insert holes; and breakable connecting portions integrally formed between the other end portion of the shaft portion and the inner circumferential surface of the at least one pin insert hole, for connecting the pin member and the connector body. With this structure, the plates can be reliably connected and fixed together by the connector with a simple operation.

4 Claims, 7 Drawing Sheets

CONNECTOR FOR PLATES

BACKGROUND OF THE INVENTION

The present invention relates to a connector for connecting and fixing plates such as a bumper and a fender liner of an automobile. More particularly it relates to a connector for plural plates which can reliably connect and fix the plates by a significantly simple operation with good workability.

Figure 10A:
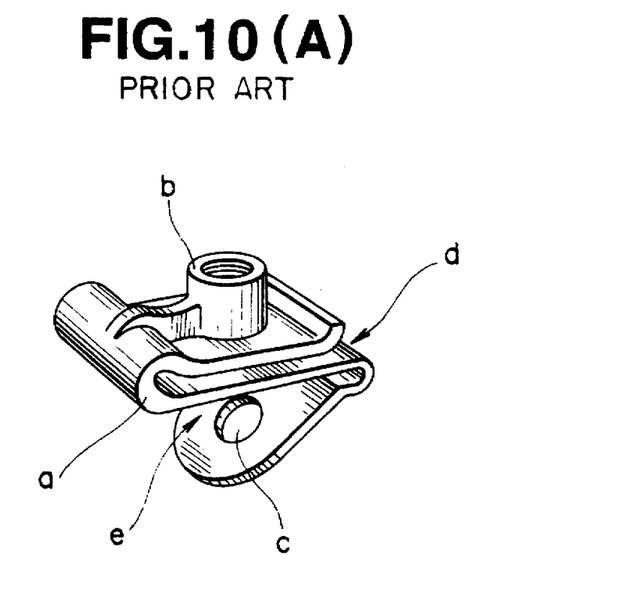
FIG. 10A is a perspective view of a connector in the prior art.

As a conventional connector for connecting and fixing a fender liner mounted inside a fender of an automobile to a fender body or a bumper, there is known a connector disclosed in Japanese Utility Model Laid-open No. 55-113815. This connector is shown in FIG. 10A, and it is generally constructed of a base plate a bent in a substantially sectionally S-shaped configuration. The base plate a has one end portion formed with a cylindrical nut portion b having an internally threaded hole. The other end portion and an intermediate portion of the base plate a are formed with bolt insert holes c. The other end portion of the base plate a is bent obliquely outward from the intermediate portion.

Figure 10B:
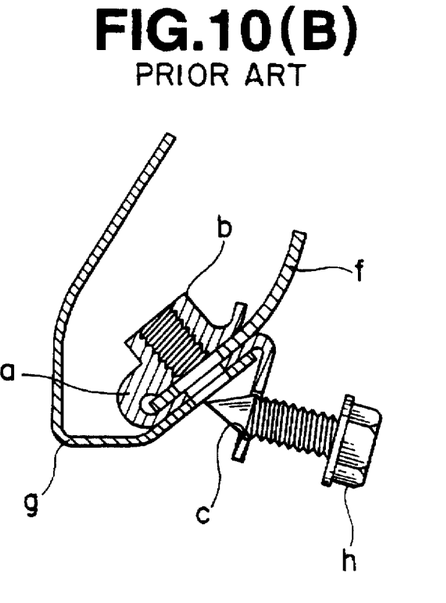
FIGS. 10B and 10C are sectional views illustrating an operation for connecting and fixing two plates by using the connector shown in FIG. 10A.
Figure 10C:
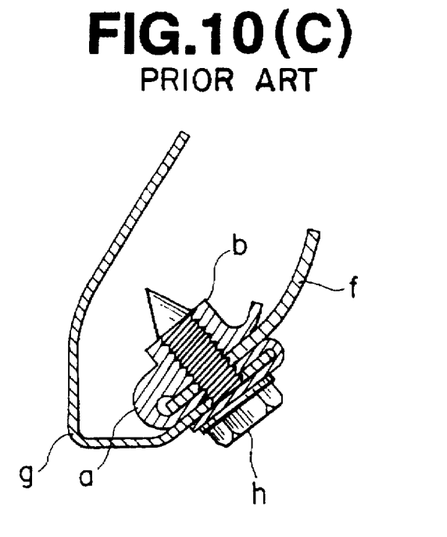

In connecting and fixing a fender liner and a fender body or a bumper by using this connector (FIGS. 10B and 10C show the connection of a fender liner g and a fender body f), a platelike end portion of the fender body f is inserted into a plate insert recess d (see FIG. 10A) formed between the one end portion and the intermediate portion of the base plate a. A platelike end portion of the fender liner g is inserted into a plate insert recess e (see FIG. 10A) formed between the other end portion and the nintermediate portion of the base plate a so as to align the threaded hole of the nut portion b formed at the one end portion of the base plate a of the connector, the bolt insert holes c formed through the other end portion and the intermediate portion of the base plate a, a bolt insert hole formed through the fender liner g, and a bolt insert hole formed through the fender body f.

In this condition, a bolt h is inserted into the bolt insert hole c of the other end portion of the base plate a. Next, the bolt h is urged to bend the other end portion of the base plate a toward the intermediate portion, and simultaneously a shaft portion of the bolt h is inserted through the bolt insert holes of the fender body f, the fender liner g, and the intermediate portion of the base plate a. Then, the shaft portion of the bolt h is threadedly engaged into the threaded hole of the nut portion b (see FIG. 10C), thereby connecting and fixing the fender body f and the fender liner g.

In the case of connecting and fixing the fender body f and the fender liner g by using the above-mentioned conventional connector, the bolt h must be inserted from the bolt insert hole c of the other end portion of the base plate a and next be secured to the nut portion b as described above. However, such an operation for securing the bolt h is very troublesome because this operation must be carried out in a very narrow space inside the fender, for example.

Furthermore, in securing the bolt h after inserting the platelike end portions of the fender body f and the fender liner g into the plate insert recesses d and e of the base plate a, respectively, it is necessary to hold the connector, the fender body f, and the fender liner g with a hand or the like in the condition where the bolt insert holes c of the base plate a, the threaded hole of the nut portion b, and the bolt insert holes of the fender body f and the fender liner g are all aligned with each other. Also in this point of view, the connecting operation is very troublesome.

SUMMARY OF THE INVENTION

It is accordingly an object of the present invention to provide a connector for plates which can reliably connect and fix the plates with a significantly simple operation, and can be preferably used to connect and fix a fender liner and a fender body or a bumper of an automobile.

According to the present invention, there is provided a connector for plates, comprising a connector body formed of a synthetic resin, including a base plate bent at an intermediate portion thereof to form at least one plate insert recess, and pin insert holes formed through the base plate so as to be aligned with each other from one outer surface of the base plate to the other end surface of the base plate; a pin member formed of a synthetic resin, including a shaft portion and a head portion formed at one end of the shaft portion, the shaft portion having an elastically deformable locking lug, the other end portion of the shaft portion being inserted in at least one of the pin insert holes from the other outer surface of the connector body; and at least one breakable connecting portion integrally formed between the other end portion of the shaft portion and an inner circumferential surface of the at least one pin insert hole, for connecting the pin member and the connector body.

Preferably, the base plate is bent in a substantially sectionally S-shaped configuration, and the at least one plate insert recess comprises two plate insert recesses formed at the intermediate portion of the base plate. Further, the connector further comprises a plate engaging projection formed on the inner surface of the at least one plate insert recess, for engaging a recess formed in the plate to be connected.

Further, the inner circumferential surface of each pin insert hole may be formed with a lug insert recess corresponding to the locking lug of the shaft portion of the pin member, and the pin member may be mounted within the at least one pin insert hole of the connector body in such a condition that the lug insert recess and the locking lug are displaced from each other at a given angle in a circumferential direction of the shaft portion. In this case, a lug engaging shoulder for engaging the locking lug of the pin member may be formed around an opening of one of the pin insert holes opening to the other outer surface of the connector body at a position except the lug insert recess, and a lug stop projection may be formed between the lug engaging shoulder and the lug insert recess.

The connector of the present invention is used to connect and fix two plates together. One of the two plates is inserted into the plate insert recess of the connector body, and the other plate is placed on the outer surface of one end portion of the connector body. In the case where the connector body has two plate insert recesses, the two plates are respectively inserted into the two plate insert recesses. In the condition where pin insert holes formed through the two plates are aligned with the pin insert holes of the connector body, the head portion of the pin member is pushed to insert the shaft portion of the pin member through the pin insert holes of the connector body and the two plates until the locking lug of the shaft portion comes into engagement with the outer periphery of the opening of the pin insert hole opening to the other outer surface of the connector body. Thus, the pin member is passed through the connector body and the two plates to thereby connect and fix the two plates together.

More specifically, when the head portion of the pin member is pushed in the condition where the pin insert holes of the two plates are aligned with the pin insert holes of the connector body, the connecting portion connecting the pin member and the connector body is broken to allow the shaft portion of the pin member to be inserted through the pin insert holes of the connector body and the two plates.

Accordingly, the locking lug of the shaft portion first comes into abutment against the inner circumferential edge of the pin insert hole of the connector body at its one end portion. When the pin member is further pushed, the locking lug is elastically deformed radially inward of the shaft portion by the inner circumferential surfaces of the pin insert holes, and the shaft portion is advanced in the pin insert holes to finally project from the other outer surface of the connector body. When the locking lug reaches the other outer surface of the connector body, the locking lug elastically deformed by the inner circumferential surfaces of the pin insert holes are returned to its original condition to come into engagement with the outer periphery of the opening of the pin insert hole opening to the other outer surface of the connector body. Thus, the pin member is locked to the connector body in the condition where the shaft portion of the pin member is passed through the connector body and the two plates, thereby connecting and fixing the two plates.

In the case where one of the two plates is inserted into the plate insert recess of the connector body, and the other plate is placed on the outer surface of the connector body at its one end portion, the one plate is held between the opposite end portions of the bent base plate constituting the connector body, and is fixed to the connector body by the shaft portion of the pin member inserted through the connector body and the two plates. The other plate is held between the outer surface of the one end portion of the connector body and the head portion of the pin member, and is fixed to the connector body by the shaft portion of the pin member inserted through the connector body and the two plates. In this manner, the two plates are connected and fixed together through the connector body. In the case where the connector body is formed by the base plate having a substantially sectionally S-shaped configuration to provide the two plate insert recesses in the connector body, and the two plates are respectively inserted into the two plate insert recesses, one of the two plates is held between one end portion and an intermediate portion of the base plate, and the other plate is held between the other end portion and the intermediate portion. In this condition, the two plates are fixed to the connector body by the shaft portion of the pin member inserted through the connector body and the two plates. In this manner, the two plates are connected and fixed together through the connector body.

According to the connector of the present invention, two plates can be reliably connected and fixed together with a greatly simple operation such that the connector body is set between the two plates and the pin member separably connected to the connector body is pushed at one stroke.

Further, in the connector of the present invention, the plate engaging projection for engaging a recess formed through the plate to be connected may be formed within the plate insert recess of the connector body as described above, thereby further simplifying the operation for connecting the plate.

More specifically, the plate can be temporarily fixed to the connector body by inserting the plate into the plate insert recess of the connector body to engage the plate engaging projection formed within the plate insert recess into the recess (pin insert hole) of the plate in the condition that the pin insert hole of the plate and the pin insert holes of the connector body are aligned with each other. In this condition, the pin member is pushed to very simply carry out the operation for connecting and fixing the plate to the connector body. In particular, the base plate of the connector body may be bent in a substantially sectionally S-shaped configuration to form the two plate insert recesses, and the two engaging projections may be respectively formed within the two plate insert recesses of the connector body. In this case, the two plates can be temporarily fixed and connected together by inserting the two plates into the two plate insert recesses, respectively, to engage the two plate engaging projections into the recesses (pin insert holes) of the two plates, respectively, in the condition that the pin insert holes of the two plates and the pin insert holes of the connector body are aligned with each other. In this condition, the pin member is pushed at one stroke to firmly connect and fix the two plates through the connector body. Thus, the operation for connecting and fixing the two plates can be greatly simply carried out.

Further, according to the connector of the present invention, the lug insert recess corresponding to the locking lug of the shaft portion of the pin member may be formed on the inner circumferential surfaces of the pin insert holes of the connector body, so as to remove the pin member from the connector body after canceling the locked condition of the pin member to the connector body.

More specifically, the locking lug of the shaft portion of the pin member is engaged with the outer periphery of the opening of the pin insert hole opening to the other outer surface of the connector body, thus maintaining the locked condition of the pin member to the connector body. In canceling this locked condition and canceling the connected condition of the plate by pulling the pin member from the pin insert holes of the connector body, a tool such a screwdriver is engaged with the head portion of the pin member to rotate the pin member until the locking lug of the shaft portion comes into alignment with the lug insert recess, thereby canceling the locked condition maintained by the locking lug. In this condition, the pin member is pulled out to easily cancel the connected and fixed condition of the plate. In this case, the pin member is mounted within the pin insert holes of the connector body in the condition that the lug insert recess and the locking lug are displaced from each other at a given angle in the circumferential direction of the shaft portion. Accordingly, in forcing the pin member into the pin insert holes to lock the pin member, the pin member must only be pushed to engage the locking lug with the outer periphery of the opening of the pin insert hole on the other outer surface of the connector body, thereby easily locking the pin member.

In the above case where the lug insert recess is formed on the inner circumferential surface of each pin insert hole of the connector body to allow the removal of the pin member from the connector body, it is preferable to provide the lug engaging shoulder for engaging the locking lug along the outer periphery of the opening of the pin insert hole on the other outer surface of the connector body except the position of the lug insert recess and to further provide the lug stop projection between the lug engaging shoulder and the lug insert recess. With this structure, the engaged condition of the locking lug may be prevented from being spontaneously canceled by undue rotation of the pin member due to vibrations or the like, causing unintentional cancellation of the locked condition of the pin member.

More specifically, the locking lug of the pin member is engaged with the lug engaging shoulder formed along the outer periphery of the opening of the pin insert hole, thereby maintaining the locked condition of the pin member. Furthermore, the lug stop projection is formed between the lug engaging shoulder and the lug insert recess for allowing the cancellation of the locked condition. Accordingly, even if the pin member is unduly rotated by vibrations or the like, the locking lug comes into abutment against the lug stop projection to thereby reliably prevent the locking lug from entering the lug insert recess, thus preventing unintentional cancellation of the locked condition. On the other hand, in canceling the locked condition by intentionally rotating the pin member, the locking lug is elastically deformed radially inward of the shaft portion by the lug stop projection during rotation of the pin member to pass over the lug stop projection and then enter the lug insert recess. Thus, the locked condition of the pin member can be intentionally canceled.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
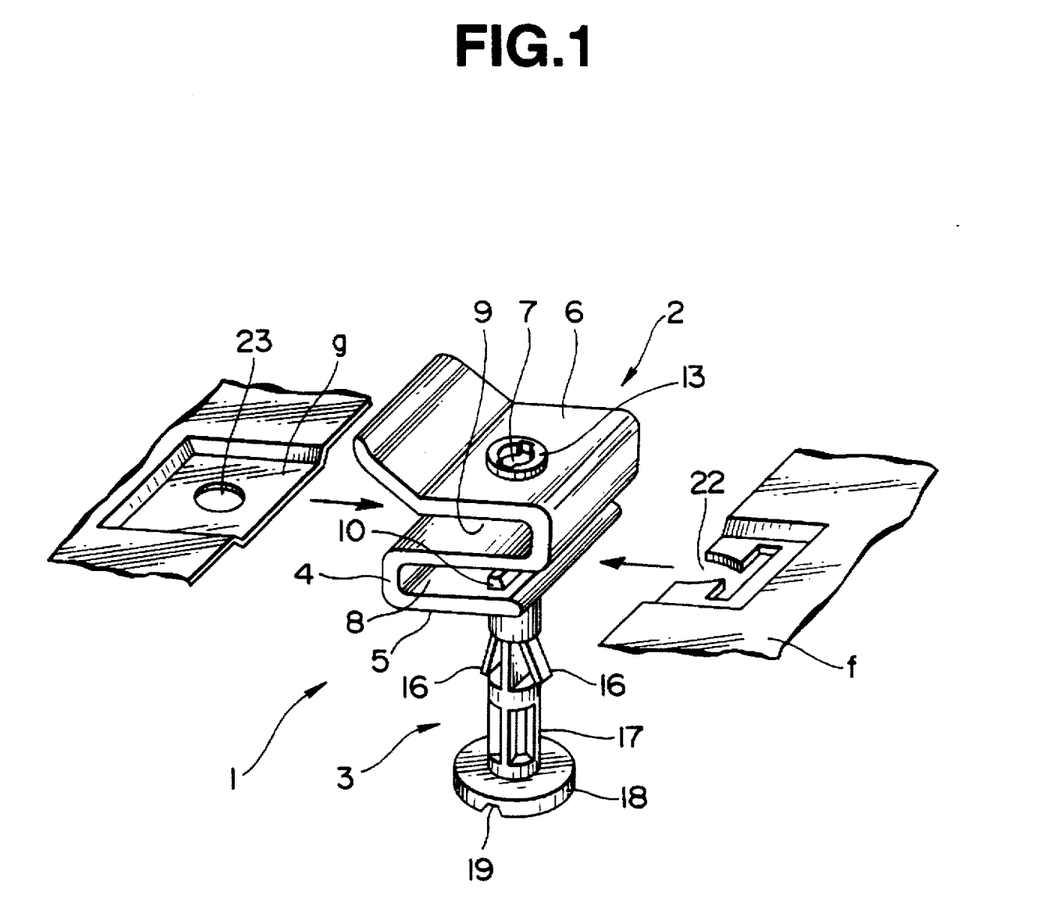
FIG. 1 is a perspective view of a connector according to a preferred embodiment of the present invention and two plates to be connected and fixed together by using the connector.

FIGS. 1 to 9B show a connector for plates according to the preferred embodiment of the present invention. The connector is preferably used to fix a fender liner to a fender body or a bumper in an automobile. As shown in FIG. 1, a connector 1 in this preferred embodiment is used to connect a fender liner g and a bumper f.

The connector 1 is generally composed of a connector body 2 and a pin member 3. The connector body 2 is bent in a substantially sectionally S-shaped configuration. The connector body 2 and the pin member 3 are integrally connected together.

Figure 6:
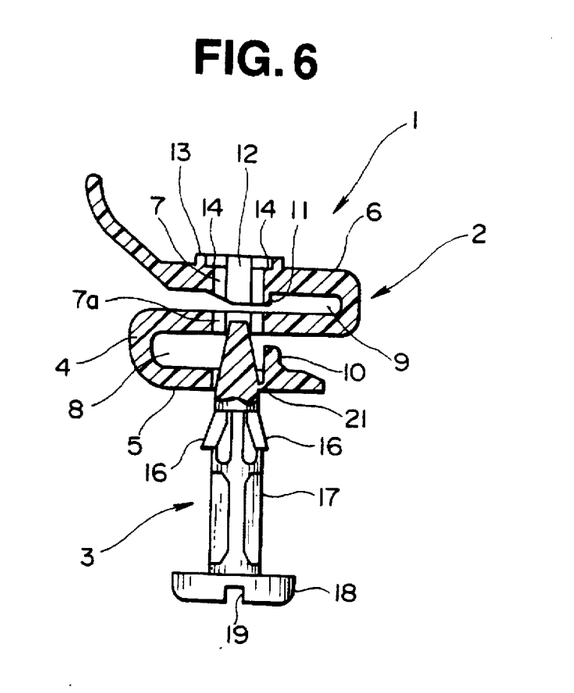
FIG. 6 is a partially sectional, front elevation of the connector shown in FIG. 1.

The connector body 2 is formed of a synthetic resin, and it includes a base plate 4 bent in a substantially sectionally S-shaped configuration and pin insert holes 7 formed through the base plate 4 so as to extend from one outer surface 5 to the other outer surface 6 of the base plate 4 in such a manner as to be aligned with each other (see FIG. 6). Owing to the S-shaped bending of the base plate 4, an intermediate portion of the base plate 4 is formed with a first plate insert recess 8 and a second plate insert recess 9 opening in opposite directions with respect to each other.

Figure 3:
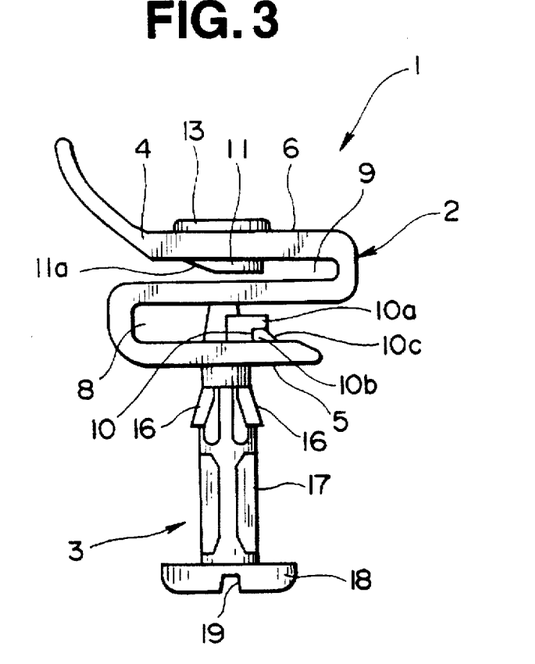
FIG. 3 is a front elevation of the connector shown in FIG. 1.
Figure 4:
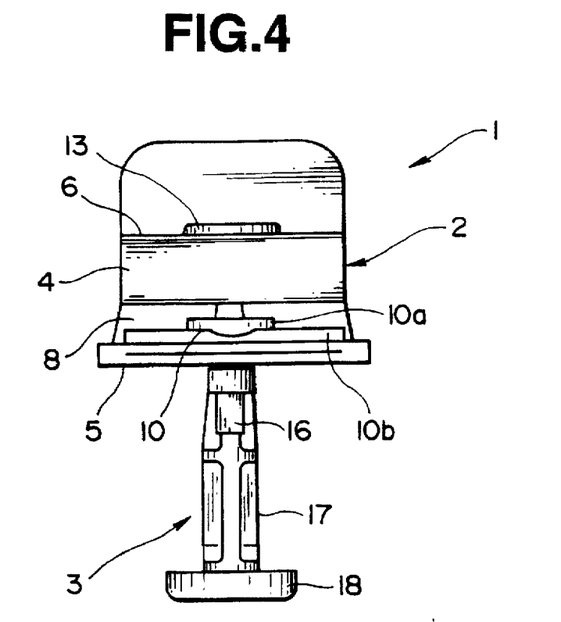
FIG. 4 is a side elevation of the connector shown in FIG. 1.
Figure 5:
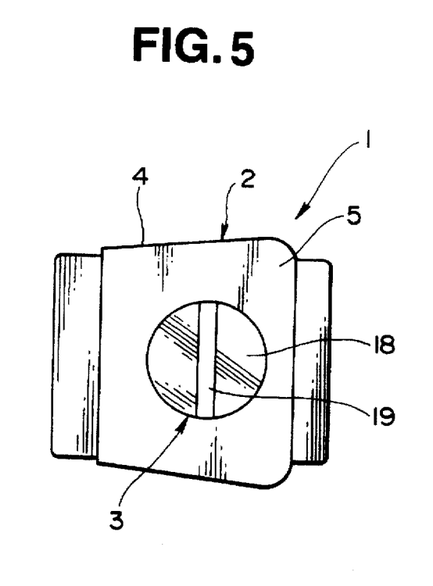
FIG. 5 is a bottom plan view of the connector shown in FIG. 1.

As shown in FIGS. 3 and 4, a first plate engaging projection 10 is provided in the first plate insert recess 8 so as to project from the inner surface of the base plate 4 at one end portion thereof. The first plate engaging projection 10 is composed of an arcuate wall-like projection 10a formed along the circumference of the lower pin insert hole 7 and a straight ridge-like projection 10b extending continuously from the arcuate wall-like projection 10a in the transverse direction of the base plate 4 (in the lateral direction as viewed in FIG. 4). As shown in FIGS. 3 and 6, a second plate engaging projection 11 is provided in the second plate insert recess 9. The second plate engaging projection 11 is an annular wall-like projection formed along the circumference of the upper pin insert hole 7 so as to project from the inner surface of the base plate 4 at the other end portion thereof. The straight ridge-like projection 10b of the first plate engaging projection 10 is obliquely cut on the opening side of the first plate insert recess 8 to form a tapering surface 10c, and the second plate engaging projection 11 is similarly obliquely cut on the opening side of the second plate insert recess 9 to form a tapering surface 11a (see FIG. 3).

Figure 2A:
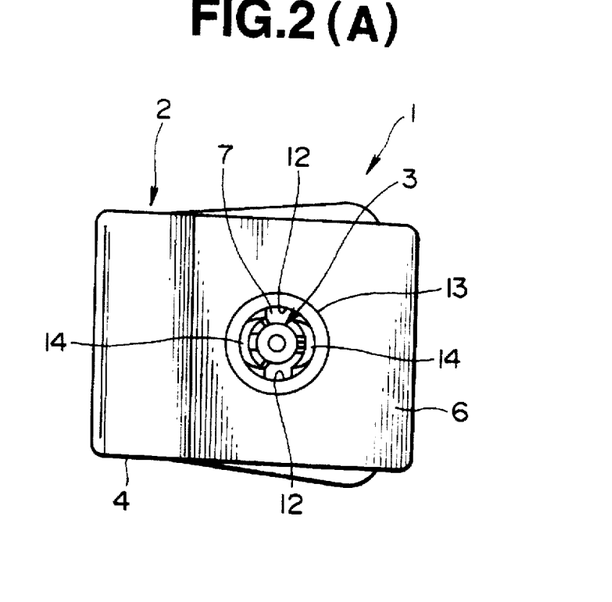
FIG. 2A is a top plan view of the connector shown in FIG. 1.
Figure 2B:
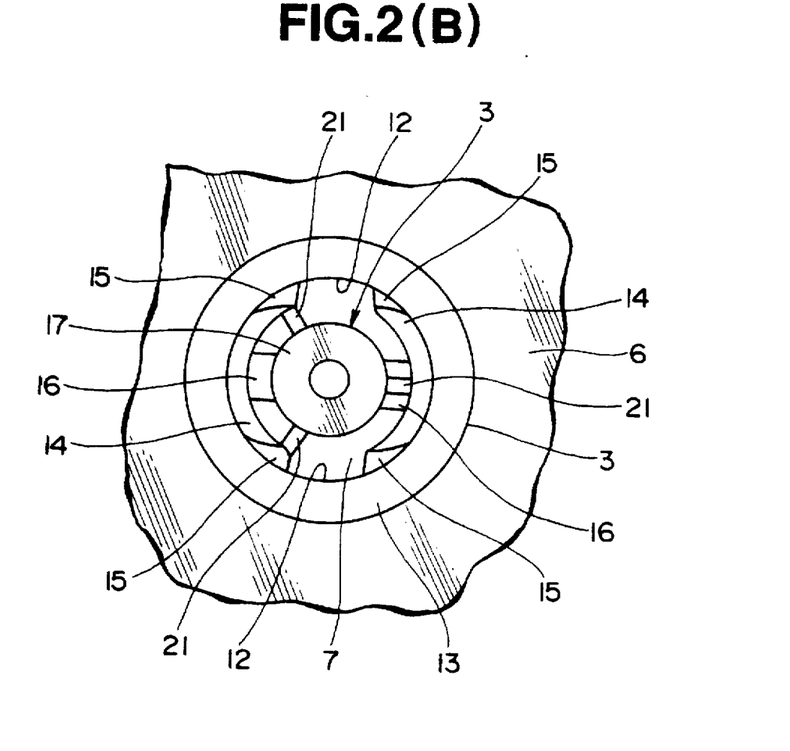
FIG. 2B is an enlarged top plan view of an essential part of the connector shown in FIG. 2A.

As shown in FIGS. 2A and 2B, two lug insert recesses 12 opposed to each other are formed on the inner circumferential surface of each pin insert hole 7. A short cylindrical projection 13 is formed along the circumference of the upper pin insert hole 7 opening to the outer surface 6 of the base plate 4. Two lug engaging shoulders 14 opposed to each other are formed on the inner circumferential surface of the short cylindrical projection 13 at its portions except the lug insert recesses 12. Further, four triangular lug stop projections 15 are formed between the lug engaging shoulders 14 and the lug insert recesses 12.

Figure 7:
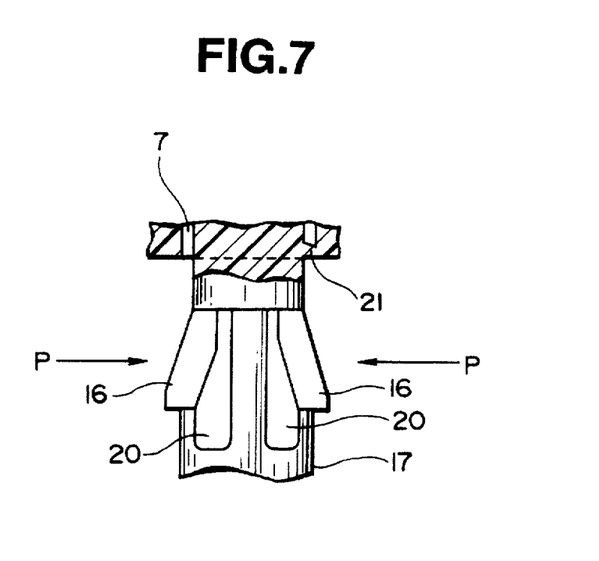
FIG. 7 is a partially sectional, enlarged front elevation of an essential part of the connector shown in FIG. 6.

The pin member 3 is also formed of a synthetic resin. As shown in FIGS. 3, 4, and 6, the pin member 3 is composed of a shaft portion 17 and a disk-shaped head portion 18 integrally formed with each other. The head portion 18 is formed at the base or lower end of the shaft portion 17. Two locking lugs 16 opposed to each other are formed on the outer circumferential surface of the shaft portion 17 at its longitudinally intermediate portion. The front or upper end portion of the shaft portion 17 is gradually reduced in diameter. The head portion 18 is formed with a tool engaging groove 19 extending across the diameter of the head portion 18. As shown in FIG. 7, the locking lugs 16 are so formed as to radially outward diverge from the shaft portion 17 in such a manner that the front or lower end portions of the locking lugs 16 are radially outward projected from the outer circumferential surface of the shaft portion 17. The shaft portion 17 is partially cut out at its portions inside of the locking lugs 16 to form two through holes 20. The locking lugs 16 are elastically deformable radially inward of the shaft portion 17 by external pressures P.

As shown in FIG. 6, the pin member 3 is integrally connected with the connector body 2 by three small breakable connecting portions 21 formed between the outer circumferential surface of the shaft portion 17 and the inner circumferential surface of the lower pin insert hole 7 (see FIG. 2B). The front or upper end portion of the shaft portion 17 of the pin member 3 is inserted through the lower pin insert hole 7 opening to the outer surface 5 of the connector body 2 and into the intermediate pin insert hole 7 (7a) present between the first plate insert recess 8 and the second plate insert recess 9.

In connecting the fender liner g at its end portion to the bumper f at its end portion by using the connector 1 as shown in FIG. 1, the end portion of the bumper f having a substantially T-shaped pin insert hole 22 is press-fitted into the first plate insert recess 8 of the connector body 2, and the end portion of the fender liner g having a circular pin insert hole 23 is press-fitted into the second plate insert recess 9 of the connector body 2.

Figure 8A:
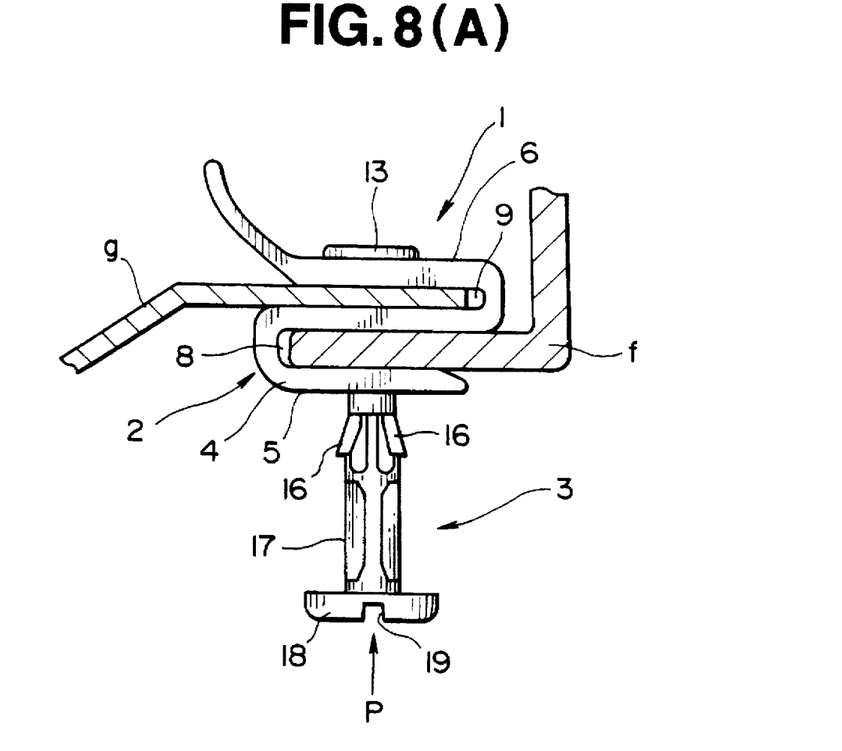
FIG. 8A is a partially sectional, front elevation illustrating a condition where the two plates have been inserted in a connector body of the connector to temporarily fix the two plates.

At this time, the end portion of the bumper f comes into abutment against the tapering surface 10c of the first plate engaging projection 10 formed in the first plate insert recess 8, thereby elastically deform the base plate 4 of the connector body 2 to expand the first plate insert recess 8. When the bumper f is forced in a given amount into the first plate insert recess 8 (the condition shown in FIG. 8A), the base plate 4 is returned to its original condition by its elasticity, and the first plate engaging portion 10 comes into engagement with the pin insert hole 22 of the bumper f (see FIG. 1), thus temporarily fixing the bumper f to the connector body 2. Similarly, the second plate engaging projection 11 formed in the second plate insert recess 9 (see FIG. 3) comes into engagement with the pin insert hole 23 of the fender liner g (see FIG. 1), thus temporarily fixing the fender liner g to the connector body 2. In this manner, the bumper f and the fender liner g are temporarily fixed to the connector body 2 in the condition that the pin insert holes 22 and 23 of the bumper f and the fender linger g are aligned with the pin insert holes 7 of the connector body 2 as shown in FIG. 8A. Thus, the bumper f and the fender liner g are held by the connector body 2 in the temporarily fixed condition.

Figure 8B:
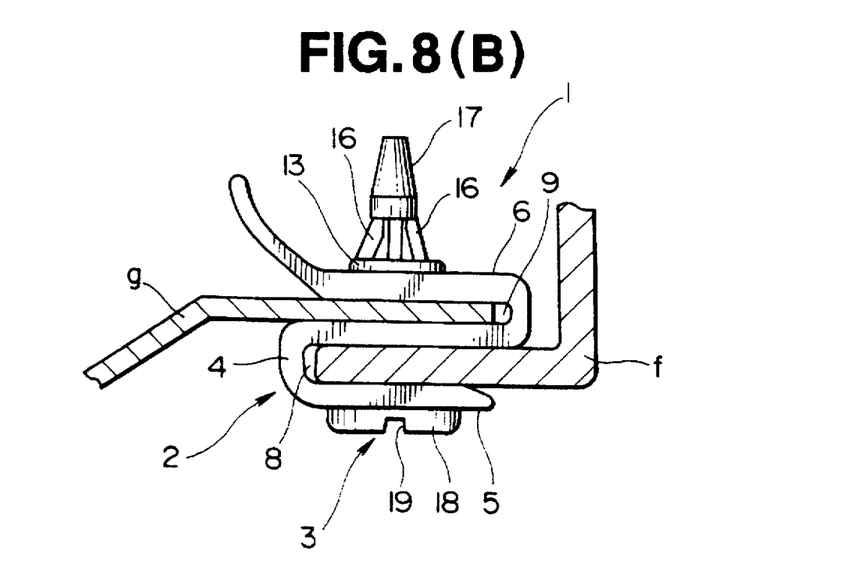
FIG. 8B is a view similar to FIG. 8A, illustrating a condition where a pin member of the connector has been pushed to lock the pin member.
Figure 9A:
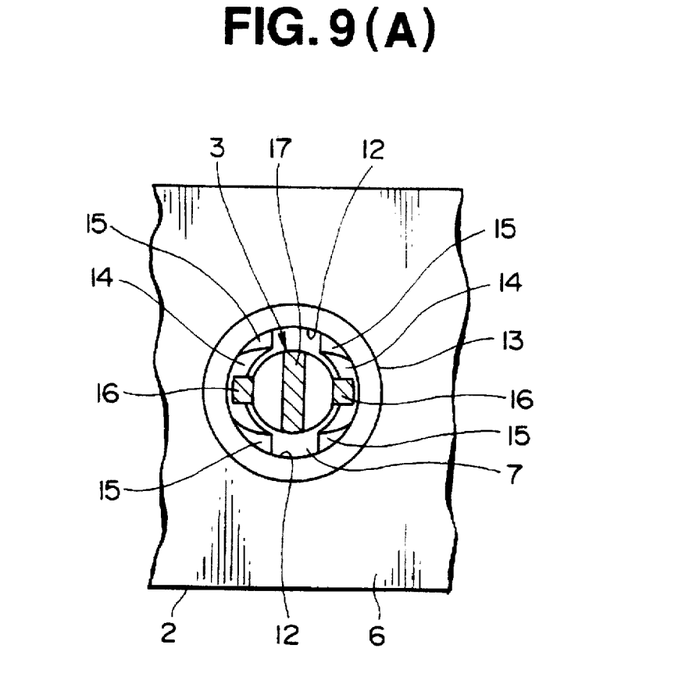
FIG. 9A is a partially sectional, enlarged top plan view of the connector in the locked condition of the pin member.
Figure 9B:
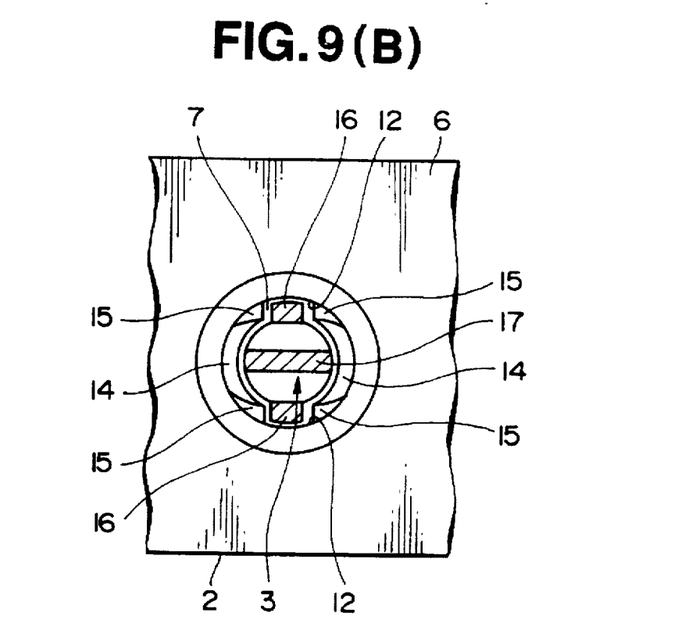
FIG. 9B is a view similar to FIG. 9A, illustrating a condition where the locked condition of the pin member has been canceled.

Next, the head portion 18 of the pin member 3 is pushed as shown by an arrow P in FIG. 8A. As a result, the connecting portions 21 connecting the pin member 3 and the connector body 2 are broken to allow insertion of the shaft portion 17 of the pin member 3 into the pin insert holes 7, 22, and 23 of the connector body 2, the fender liner g, and the bumper f. At this time, the locking lugs 16 of the shaft portion 17 come into abutment against the inner circumferential edge of the lower pin insert hole 7. When the pin member 3 is further pushed, the locking lugs 16 are elastically deformed radially inward of the shaft portion 17 by the inner circumferential surfaces of the pin insert holes 7, 22, and 23, and the shaft portion 17 is further inserted through the pin insert holes 7, 22, and 23 until the front or upper end portion of the shaft portion 17 projects from the outer surface 6 of the connector body 2 as shown in FIG. 8B. Finally, when the locking lugs 16 reach the outer surface 6 of the connector body 2, the deformed condition of the locking lugs 16 by the inner circumferential surface of the upper pin insert hole 7 is canceled, so that the locking lugs 16 are returned to their original condition by their elasticity to come into engagement with the lug engaging shoulders 14 formed inside the short cylindrical projection 13 as shown in FIG. 9A. As a result, the shaft portion 17 of the pin member 3 is locked by the locking lugs 16 engaged with the lug engaging shoulders 14 in the condition that the shaft portion 17 is passed through the connector body 2, the bumper f, and the fender liner g. Thus, the bumper f and the fender liner g are securely connected and fixed.

According to the connector 1 of the preferred embodiment mentioned above, the bumper f and the fender liner g can be securely connected and fixed by a simple operation such that the connector body 2 is first set between the bumper f and the fender liner g, and the pin member 3 mounted on the connector body 2 is next pushed at one stroke. Furthermore, before pushing the pin member 3, the bumper f and the fender liner g can be held together in a temporarily connected condition by inserting the bumper f and the fender liner g into the first and second plate insert recesses 8 and 9 of the connector body 2, respectively, and engaging the first and second engaging projections 10 and 11 with the pin insert holes 22 and 23 of the bumper f and the fender liner g, respectively, in the condition that the pin insert holes 22 and 23 of the bumper f and the fender liner g are aligned with the pin insert holes 7 of the connector body 2. In this temporarily connected condition, the pin member 3 is pushed at one stroke to thereby securely connect and fix the bumper f and the fender liner g. Accordingly, the operation for connecting and fixing the bumper f and the fender liner g can be greatly simply carried out without the need for supporting the bumper f and the fender liner g with a hand.

Further, according to the connector 1 of this preferred embodiment, the locked condition of the pin member 3 to the connector body 2 can be canceled, and the connected condition of the bumper f and the fender liner g can be easily canceled by removing the pin member 3 from the connector body 2.

More specifically, the locked condition of the pin member 3 as shown in FIG. 9A where the locking lugs 16 of the shaft portion 17 of the pin member 3 are engaged with the lug engaging shoulders 14 of the short cylindrical projection 13 formed on the outer surface 6 of the connector body 2 can be canceled. Then, the connected condition of the bumper f and the fender liner g can be easily canceled by pulling the pin member 3 from the pin insert holes 7 of the connector body 2. In canceling the locked condition of the pin member 3, a tool such as a screwdriver is engaged with the tool engaging groove 19 of the head portion 18 of the pin member 3 to rotate the pin member 3 to such a position that the locking lugs 16 of the shaft portion 17 come to alignment with the lug insert recesses 12 of the pin insert holes 7. In this unlocked condition, the pin member 3 is pulled from the pin insert holes 7 to thereby easily cancel the connected condition of the bumper f and the fender liner g.

Further, according to the connector 1 of the preferred embodiment, the lug stop projections 15 are formed between the lug engaging shoulders 14 and the lug insert recesses 12, thereby reliably preventing undue cancellation of the locked condition of the pin member 3 such that the pin member 3 is rotated by vibrations or the like to cause spontaneous disengagement of the locking lugs 16 from the lug engaging shoulders 14.

More specifically, as shown in FIG. 9A, the locking lugs 16 of the pin member 3 are engaged with the lug engaging shoulders 14 of the short cylindrical projection 13 formed around the opening of the upper pin insert hole 7, thus locking the pin member 3 to the connector body 2. The lug stop projections 15 are formed between the lug engaging shoulders 14 and the lug insert recesses 12 for allowing the cancellation of the locked condition of the pin member 3. Accordingly, even if the pin member 3 is rotated by vibrations or the like, the locking lugs 16 come into abutment against the lug stop projections 15 and is therefore prevented from entering the lug insert recesses 12. Thus, undue or unintentional cancellation of the locked condition of the pin member 3 can be reliably prevented. On the other hand, in canceling the locked condition of the pin member 3 by intentionally rotating the pin member 3 with a tool, the locking lugs 16 are elastically deformed radially inward of the shaft portion 17 by the inner surfaces of the lug stop projections 15 by rotating the pin member 3, and pass over the lug stop projections 15 to enter the lug insert recesses 12. Thus, the locked condition of the pin member 3 is canceled.

While the connector 1 according to the preferred embodiment of the present invention has been described, it is to be noted that the connector of the present invention is not limited to the above preferred embodiment, but various modifications and changes may be made. For example, although the connector body 2 is formed in a substantially sectionally S-shaped configuration to provide the two plate insert recesses 8 and 9 in the above preferred embodiment, the connector body 2 may be formed in a substantially sectionally U-shaped configuration to provide one plate insert recess. In this case, one of the two plates to be connected is inserted into the plate insert recess, and the other plate is fixedly held between the connector body and the head portion of the pin member. Further, the lug engaging shoulders 14, the lug insert recesses 12, and the short cylindrical projection 13 in the above preferred embodiment may be omitted. In addition, the shape of the pin member 3, the number and positions of the connecting portions 21 for integrally connecting the pin member 3 and the connector body 2, etc. may be suitably changed without departing from the scope of the present invention. Further, the application of the connector of the present invention is not limited to the connection of the fender liner and the fender body or the bumper of an automobile, but the present invention may be applied to the connection of various plates or plate portions of various members.

According to the present invention as described above, the plates can be reliably connected and fixed by the connector with a greatly simple operation. The connector of the present invention is preferably used to connect and fix a fender liner and a fender body or a bumper of an automobile.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A connector for plates, comprising:

a connector body formed of a synthetic resin, including a base plate bent in a substantially sectionally S-shaped configuration to form two plate insert recesses formed at an intermediate portion of said base plate, and pin insert holes formed through said base plate to be aligned with each other from one outer surface of said base plate to an other outer surface of said base plate;

a pin member formed of a synthetic resin, including a shaft portion and a head portion formed at one end of said shaft portion, said shaft portion having an elastically deformable locking lug, an other end portion of said shaft portion being inserted in at least one of said pin insert holes from said one outer surface of said connector body; and at least one breakable connecting portion integrally formed between said other end portion of said shaft portion and an inner circumferential surface of said at least one pin insert hole, for connecting said pin member and said connector body.

2. A connector for plates according to claim 1, further comprising a plate engaging projection formed on an inner surface of at least one plate insert recess.

3. A connector for plates according to claim 1, wherein the inner circumferential surface of each pin insert hole is formed with a lug insert recess corresponding to said locking lug of said shaft portion of said pin member, and said pin member is mounted within said at least one pin insert hole of said connector body in such a condition that said lug insert recess and said locking lug are displaced from each other at a given angle in a circumferential direction of said shaft portion.

4. A connector for plates according to claim 3, further comprising a lug engaging shoulder formed around an opening of one of said pin insert holes opening to said other outer surface of said connector body at a position except said lug insert recess, for engaging said locking lug of said pin member, and a lug stop projection formed between said lug engaging shoulder and said lug insert recess.

* * * * *